United States Patent
Burckhardt et al.

(10) Patent No.: US 7,741,425 B2
(45) Date of Patent: *Jun. 22, 2010

(54) REACTIVE POLYURETHANE-HOT MELT ADHESIVE HAVING A LOW ISOCYANATE-MONOMER CONTENT

(75) Inventors: Urs Burckhardt, Zürich (CH); Kai Paschkowski, Jork (DE); Martin Linnenbrink, Apensen (DE); Doreen Janke, Bönningstedt (DE)

(73) Assignee: Sika Technology AG, Baar (CH)

( * ) Notice: Subject to any disclaimer, the term of this patent is extended or adjusted under 35 U.S.C. 154(b) by 251 days.

This patent is subject to a terminal disclaimer.

(21) Appl. No.: 11/992,120

(22) PCT Filed: Sep. 29, 2006

(86) PCT No.: PCT/EP2006/066929

§ 371 (c)(1),
(2), (4) Date: May 16, 2008

(87) PCT Pub. No.: WO2007/036575

PCT Pub. Date: Apr. 5, 2007

(65) Prior Publication Data

US 2008/0251204 A1  Oct. 16, 2008

(30) Foreign Application Priority Data

Sep. 30, 2005  (EP)  ................... 05109112

(51) Int. Cl.
*C08G 18/00*  (2006.01)

(52) U.S. Cl. .......... 528/44; 528/65; 156/331.4
(58) Field of Classification Search .......... 528/44, 528/65; 156/331.4
See application file for complete search history.

(56) References Cited

U.S. PATENT DOCUMENTS

| 4,404,379 A | 9/1983 | Hajek et al. |
| 6,136,942 A | 10/2000 | Pfenninger et al. |
| 2005/0065276 A1 | 3/2005 | Burckhardt et al. |
| 2006/0122352 A1 | 6/2006 | Burckhardt |
| 2006/0149025 A1 | 7/2006 | Burckhardt |

FOREIGN PATENT DOCUMENTS

| DE | 44 29 679 A1 | 2/1996 |
| EP | 0 947 529 A1 | 10/1999 |
| EP | 1 329 469 A1 | 7/2003 |
| EP | 1 384 709 A1 | 1/2004 |
| EP | 1 384 735 A1 | 1/2004 |
| WO | WO 03/033562 A1 | 4/2003 |

*Primary Examiner*—Randy Gulakowski
*Assistant Examiner*—Shane Fang
(74) *Attorney, Agent, or Firm*—Oliff & Berridge, PLC

(57) ABSTRACT

The invention relates to relates to moisture-hardened hot melt adhesive which contains at least one polyurethane polymer of formula (I) which comprises aldimine groups and which is solid at room temperature, in addition to at least one polyurethane polymer P which comprises isocyanate groups, if q in formula (I) represents zero, or if X in formula (I) represents N—$R^8$ with $R^8$ as a substituent of formula (III). The compositions are characterised in that contain visibly less isocyanate monomers and are therefor particularly advantageous from a work-hygiene point of view.

26 Claims, No Drawings

REACTIVE POLYURETHANE-HOT MELT ADHESIVE HAVING A LOW ISOCYANATE-MONOMER CONTENT

FIELD OF THE INVENTION

The invention relates to the field of moisture-curing hotmelt adhesives.

PRIOR ART

Hotmelt adhesives (hotmelts) are adhesives which are based on thermoplastic polymers. These polymers are solid at room temperature, soften on heating to give viscous liquids and can therefore be applied as a melt. In contrast to the so-called warmmelt adhesives (warmmelts), which have a pasty consistency and are applied at slightly elevated temperatures, typically in the range from 40 to 80° C., the application of the hotmelt adhesives is effected at temperatures from 85° C. On cooling to room temperature, they solidify with simultaneous buildup of the adhesive strength. Classical hotmelt adhesives are unreactive adhesives. On heating, they soften or melt again, with the result that they are not suitable for use at elevated temperature. In addition, classical hotmelt adhesives often also tend to creep even at temperatures well below the softening point (cold flow).

These disadvantages were substantially eliminated in the case of the so-called reactive hotmelt adhesives by introducing into the polymer structure reactive groups leading to crosslinking. In particular, reactive polyurethane compositions are suitable as hotmelt adhesives. They are also referred to as PU-RHM for short. They generally consist of polyurethane polymers which have isocyanate groups and are obtained by reacting suitable polyols with an excess of diisocyanates. After their application, they rapidly build up a high adhesive strength by cooling and acquire their final properties, in particular their heat distortion resistance and resistance to environmental influences, by the postcrosslinking of the polyurethane polymer as a result of reaction of the isocyanate groups with moisture. Owing to the molar mass distribution resulting during the preparation of the polyurethane polymers having isocyanate groups, however, such PU-RHM generally contain significant amounts of unreacted monomeric diisocyanates which are partly expelled in gaseous form at the application temperatures of 85° C. to 200° C., typically 120° C. to 160° C., which are usual in the case of hotmelt adhesives and, in the form of irritant, sensitizing or toxic substances, they constitute a health hazard for the processor. For this reason, various efforts have been made to reduce the content of monomeric diisocyanates in reactive polyurethane compositions in general and in PU-RHM in particular.

An obvious approach is the physical removal of the monomeric diisocyanate by distillation or extraction. These methods require complicated apparatus and are therefore expensive; in addition, they cannot be readily used for all diisocyanates.

Another approach consists in the use of special diisocyanates having isocyanate groups of different reactivity. For example WO 03/033562 A1 describes the use of an asymmetrical MDI isomer, 2,4'-diphenylmethane diisocyanate, with which polyurethane polymers having a low content of monomeric diisocyanates at low viscosity can be obtained in a simple manner. A disadvantage of this process is the insufficient availability of suitable diisocyanates on an industrial scale, associated with a high price. In addition, it is necessary to make sacrifices in the crosslinking rate since mainly only the isocyanate groups having the lower reactivity are available for the crosslinking reaction.

Finally, one approach consists in using, instead of the monomeric diisocyanates, adducts or oligomers thereof in the reaction with polyols in order to reduce the volatility, described, for example, in DE 44 29 679 A1. Here, there are disadvantages in the case of the viscosity and the reactivity of the products thus prepared.

SUMMARY OF THE INVENTION

It is therefore an object of the present invention to provide reactive polyurethane compositions (PU-RHM) which can be used as hotmelt adhesive, have isocyanate groups and are obtainable in a simple process starting from polyols and industrially available monomeric diisocyanates, and which have a low content of monomeric diisocyanates and a long shelf-life and are readily processable and which undergo rapid crosslinking.

Surprisingly, it was found that the object can be achieved by compositions as claimed in claim 1. These contain polyurethane polymers which are solid at room temperature, have aldimino groups and can be prepared by reaction of corresponding polyurethane polymers having isocyanate groups with special compounds which contain one or more aldimino groups and an active hydrogen.

A further aspect of the invention relates to a cured composition as claimed in claim 14, and the use of the composition as a hotmelt adhesive and a method for adhesive bonding and articles resulting from such a method.

Finally, in a further aspect, the invention relates to a method for reducing the content of monomeric diisocyanates in polyurethane polymers having isocyanate groups or in compositions which contain polyurethane polymers having isocyanate groups, by reacting the polyurethane polymers having isocyanate groups with special compounds which contain one or more aldimino groups and an active hydrogen.

DESCRIPTION OF THE PREFERRED EMBODIMENTS

The invention relates to compositions comprising a) at least one polyurethane polymer of the formula (I) which is solid at room temperature and has aldimino groups

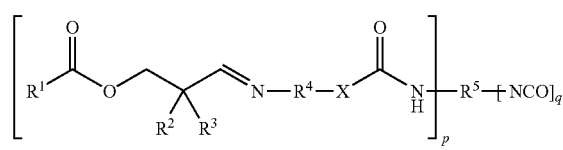

where, in formula (I)

p is an integer 1 or 2, preferably 1, q is an integer 0 or 1, preferably 1, with the proviso that p+q=2;

either $R^1$ is a monovalent hydrocarbon radical having 6 to 30 C atoms which optionally has at least one heteroatom, in particular in the form of ether oxygen;

or $R^1$ is a substituent of the formula (II)

in which $R^6$ is a divalent hydrocarbon radical having 2 to 20 C atoms which optionally has at least one heteroatom, in particular in the form of ether oxygen, and $R^7$ is a monovalent hydrocarbon radical having 1 to 20 C atoms;

$R^2$ and $R^3$ are either two substituents independent of one another which in each case are a monovalent hydrocarbon radical having 1 to 12 C atoms, or $R^2$ and $R^3$ together form a single substituent which is a divalent hydrocarbon radical having 4 to 20 C atoms, which is part of a carbocyclic ring having 5 to 8, preferably 6, C atoms, it being possible for this carbocyclic ring to be substituted;

$R^4$ is a divalent hydrocarbon radical having 2 to 12 C atoms which optionally has at least one heteroatom, in particular in the form of ether oxygen or tertiary amine nitrogen;

$R^5$ is the radical of a polyurethane polymer which is solid at room temperature and has isocyanate groups, after removal of (p+q) isocyanate groups; and X is O, S or N—$R^8$, in which either $R^8$ is a monovalent hydrocarbon radical having 1 to 20 C atoms which optionally has at least one carboxylic acid ester, nitrile, nitro, phosphonic acid ester, sulfone or sulfonic acid ester group or $R^8$ is a substituent of the formula (III) having the abovementioned meanings for $R^1$, $R^2$, $R^3$ and $R^4$

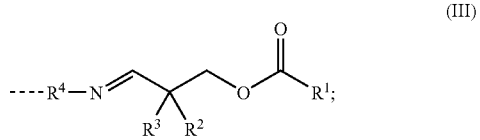

b) at least one polyurethane polymer P having isocyanate groups, if q in formula (I) is zero, or if X in formula (I) is N—$R^8$ with $R^8$ as a substituent of the formula (III).

The dashed lines in the formulae in this document are in each case the bond between a substituent and the associated molecular radical.

In a particularly preferred embodiment, $R^2=R^3$=methyl, and $R^1$ is a hydrocarbon radical having 11 to 30 C atoms.

These compositions are suitable as reactive hotmelt adhesive compositions, also referred to as "PU-RHM" for short.

In the present document, the term "polymer" comprises firstly a group of macromolecules which are chemically uniform but differ with respect to degree of polymerization, molar mass and chain length, which was prepared by a polyreaction (polymerization, polyaddition, polycondensation). Secondly, the term also comprises derivatives of such a group of macromolecules from polyreactions, i.e. compounds which were obtained by reactions such as, for example, additions or substitutions, of functional groups on specified macromolecules and which may be chemically uniform or chemically nonuniform. However, the term also comprises so-called prepolymers, i.e. reactive oligomeric preadducts whose functional groups are involved in the synthesis of macromolecules.

The term "polyurethane polymer" comprises all polymers which are prepared by the so-called diisocyanate polyaddition process. This also includes those polymers which are virtually or completely free of urethane groups. Examples of polyurethane polymers are polyether-polyurethanes, polyester-polyurethanes, polyether-polyureas, polyureas, polyester-polyureas, polyisocyanurates and polycarbodiimides.

A temperature of 25° C. is designated as "room temperature".

The polyurethane polymer of the formula (I) which is solid at room temperature and has aldimino groups can be prepared by the reaction of at least one aldimine of the formula (XI) containing an active hydrogen with at least one polyurethane polymer D having isocyanate groups. That reactive group of the aldimine of the formula (XI) which carries the active hydrogen undergoes an addition reaction with an isocyanate group of the polyurethane polymer D. In the present document, the term "active hydrogen" designates a deprotonatable hydrogen atom bonded to a nitrogen, oxygen or sulfur atom. The term "reactive group containing an active hydrogen" designates a functional group having an active hydrogen, in particular a primary or secondary amino group, a hydroxyl group, a mercapto group or a urea group.

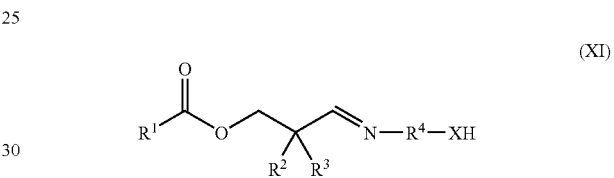

In the formula (XI), $R^1$, $R^2$, $R^3$, $R^4$ and X have the same meaning as described for formula (I).

The aldimine of the formula (XI) can be prepared from at least one sterically hindered aliphatic aldehyde A and at least one aliphatic amine B corresponding to the formula $H_2N$—$R^4$—XH, which, in addition to one or more primary amino groups, also has a further reactive group containing a reactive hydrogen.

The reaction between the aldehyde A and the amine B takes place in a condensation reaction with elimination of water. Such condensation reactions are very well known and are described, for example, in Houben-Weyl, "Methoden der organischen Chemie [Methods of Organic Chemistry]", vol. XI/2, page 73 et seq. Here, the aldehyde A is used stoichiometrically or in a stoichiometric excess relative to the primary amino groups of the amine B.

For the preparation of the aldimine of the formula (XI), at least one sterically hindered aliphatic aldehyde A of the formula (IV) is used

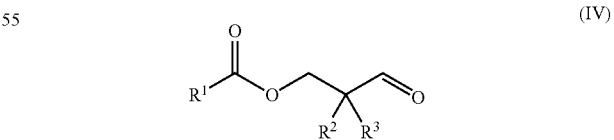

In the formula (IV), $R^1$, $R^2$ and $R^3$ have the same meaning as described for formula (I).

The aldehyde A is odorless. An "odorless" substance is understood as meaning a substance which has such little odor that it cannot be smelled by most human individuals, i.e. is not perceptible with the nose.

The aldehyde A is prepared, for example, from a carboxylic acid R¹—COOH and a β-hydroxyaldehyde of the formula (V) in an esterification reaction. This esterification can be effected by known methods, described, for example, in Houben-Weyl, "Methoden der organischen Chemie [Methods of Organic Chemistry]", vol. VIII, pages 516-528. The β-hydroxyaldehyde of the formula (V) is obtained, for example, in a crossed aldol addition from formaldehyde—or oligomeric forms of formaldehyde, such as paraformaldehyde or 1,3,5-trioxane—and an aldehyde of the formula (VI).

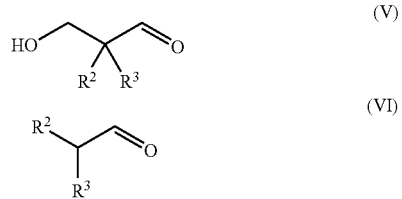

In the formulae (V) and (VI), $R^2$ and $R^3$ have the same meaning as described for formula (I).

For example the following may be mentioned as suitable carboxylic acids R¹—COOH for the esterification with the β-hydroxyaldehydes of the formula (V): saturated aliphatic carboxylic acids, such as enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; monounsaturated aliphatic carboxylic acids, such as palmitoleic acid, oleic acid, erucic acid; polyunsaturated aliphatic carboxylic acids, such as linoleic acid, linolenic acid, elaeostearic acid, arachidonic acid; cycloaliphatic carboxylic acids, such as cyclohexanecarboxylic acid; arylaliphatic carboxylic acids, such as phenylacetic acid; aromatic carboxylic acids, such as benzoic acid, naphthoic acid, toluic acid, anisic acid; isomers of these acids; fatty acid mixtures from the industrial saponification of natural oils and fats, such as, for example, rapeseed oil, sunflower oil, linseed oil, olive oil, coconut oil, oil palm kernel oil and oil palm oil; and monoalkyl and monoaryl esters of dicarboxylic acids, as obtained from the monoesterification of dicarboxylic acids, such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6, 9-trioxaundecanedioic acid and similar derivatives of polyethylene glycol, with alcohols such as methanol, ethanol, propanol, butanol, higher homologues and isomers of these alcohols.

Caprylic acid, capric acid, lauric acid, myristic acid, palmitic acid, stearic acid, oleic acid, linoleic acid, linolenic acid, the isomers of these acids and industrial mixtures of fatty acids which contain these acids are preferred. Lauric acid is particularly preferred.

Suitable aldehydes of the formula (VI) for reaction with formaldehyde to give β-hydroxyaldehydes of the formula (V) are, for example, isobutyraldehyde, 2-methylbutyraldehyde, 2-ethylbutyraldehyde, 2-methylvaleraldehyde, 2-ethylcapronaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde and diphenylacetaldehyde. Isobutyraldehyde is preferred.

Suitable β-hydroxyaldehydes of the formula (V) are, for example, the products from the reaction of formaldehyde with the aldehydes of the formula (VI) which are mentioned above as being suitable. 3-Hydroxypivalaldehyde is preferred.

The amine B is an aliphatic amine which, in addition to one or more primary amino groups, also has a further reactive group which contains an active hydrogen. In the present document, the term "primary amino group" designates an $NH_2$ group which is bonded to an organic radical, while the term "secondary amino group" designates an NH group which is bonded to two organic radicals. The term "aliphatic amine" designates compounds which contain at least one amino group which is bonded to an aliphatic, cycloaliphatic or arylaliphatic radical. They thus differ from the aromatic amines in which the amino group is bonded directly to an aromatic radical, such as, for example, in aniline or 2-aminopyridine.

For example, the compounds mentioned below are suitable as amines B:

aliphatic hydroxyamines, such as 2-aminoethanol, 2-methylaminoethanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol; derivatives of glycols, such as diethylene glycol, dipropylene glycol, dibutylene glycol and higher oligomers and polymers of these glycols, which carry a primary amino group, for example 2-(2-aminoethoxy)ethanol, triethylene glycol monoamine, α-(2-hydroxymethylethyl)-ω-(2-aminomethylethoxy)poly(oxy(methyl-1,2-ethanediyl)); derivatives of polyalkoxylated trihydric or higher-hydric alcohols or of polyalkoxylated diamines which carry a hydroxyl group and an amino group; products from the monocyanoethylation and subsequent hydrogenation of glycols, for example 3-(2-hydroxyethoxy)propylamine, 3-(2-(2-hydroxyethoxy)ethoxy)propylamine, 3-(6-hydroxyhexyloxy)propylamine;

aliphatic mercaptoamines, such as 2-aminoethanethiol (cysteamine), 3-aminopropanethiol, 4-amino-1-butanethiol, 6-amino-1-hexanethiol, 8-amino-1-octanethiol, 10-amino-1-decanethiol, 12-amino-1-dodecanethiol; aminothio sugars, such as 2-amino-2-deoxy-6-thioglucose;

di- or polyfunctional aliphatic amines which, in addition to one or more primary amino groups, carry a secondary amino group, such as N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-aminoethylpiperazine, diethylenetriamine (DETA), bishexamethylenetriamine (BHMT); di- and triamines from the cyanoethylation or cyanobutylation of primary mono- and diamines, for example N-methyl-1,3-propanediamine, N-ethyl-1,3-propanediamine, N-butyl-1, 3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, dipropylenetriamine (DPTA), N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, and fatty diamines, such as N-cocoalkyl-1,3-propanediamine, N-oleyl-1,3-propanediamine, N-soyaalkyl-1,3-propanediamine, N-tallowalkyl-1,3-propanediamine or N—($C_{16-22}$-alkyl)-1,3-propanediamine, as are obtainable, for example, under the trade name Duomeen® from Akzo Nobel; the products from the Michael-like addition of aliphatic primary di- or polyamines with acrylonitrile, maleic or fumaric acid diesters, citraconic acid diesters, acrylic and methacrylic acid esters and itaconic acid diesters, reacted in the molar ratio 1:1;

trisubstituted ureas which carry one or more primary amino groups, such as N-(2-aminoethyl)ethyleneurea, N-(2-aminoethyl)propyleneurea or N-(2-aminoethyl)-N'-methylurea.

Particularly suitable aliphatic hydroxy- and mercaptoamines are those in which the primary amino group are separated from the hydroxyl or the mercapto group by a chain of at least 5 atoms, or by a ring, such as, for example, in 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol, 2-(2-aminoethoxy)ethanol, triethylene glycol monoamine, α-(2-hydroxymethylethyl)-ω-(2-aminomethylethoxy)poly(oxy(methyl-1,2-ethanediyl)), 3-(2-hydroxyethoxy)propylamine, 3-(2-(2-hydrooxyethoxy)ethoxy)propylamine, 3-(6-hydroxyhexyloxy)propylamine, 6-amino-1-hexanethiol, 8-amino-1-octanethiol, 10-amino-1-decanethiol and 12-amino-1-docanethiol.

Preferred amines B are di- or polyfunctional aliphatic amines which, in addition to one or more primary amino groups, carry a secondary amino group, in particular N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, DETA, DPTA, BHMT and fatty diamines, such as N-cocoalkyl-1,3-propanediamine, N-oleyl-1,3-propanediamine, N-soyaalkyl-1,3-propanediamine and N-tallowalkyl-1,3-propanediamine. Aliphatic hydroxy- and mercaptoamines in which the primary amino group are separated from the hydroxyl or the mercapto group by a chain of at least 5 atoms, or by a ring, are also preferred, in particular 5-amino-1-pentanol, 6-amino-1-hexanol and higher homologues thereof, 4-(2-aminoethyl)-2-hydroxyethylbenzene, 3-aminomethyl-3,5,5-trimethylcyclohexanol, 2-(2-aminoethoxy) ethanol, triethylene glycol monoamine and higher oligomers and polymers thereof, 3-(2-hydroxyethoxy)propylamine, 3-(2-(2-hydroxyethoxy)ethoxy)propylamine and 3-(6-hydroxyhexyloxy)propylamine.

The reaction between an aldehyde A and an amine B leads to hydroxyaldimines if a hydroxyamine is used as amine B; to mercaptoaldimines if a mercaptoamine is used as amine B; to aminoaldimines if a di- or polyfunctional amine which, in addition to one or more primary amino groups, carries a secondary amino group is used as amine B; or to ureaaldimines if a trisubstituted urea which carries one or more primary amino groups is used as amine B.

Hydroxyamines and amines having one or two primary amino groups and a secondary amino group are preferred as amine B.

In one embodiment, the aldimines of the formula (XI) have a substituent N—$R^8$ as substituent X. Such aldimines of the formula (XI) can be prepared by reacting at least one sterically hindered aliphatic aldehyde A of the formula (IV) with a difunctional aliphatic primary amine C of the formula $H_2N$—$R^4$—$NH_2$ in a first step to give an intermediate of the formula (VII) which, in addition to an aldimino group, also contains a primary amino group, and then reacting this intermediate in a second step in an addition reaction with a Michael acceptor of the formula (VIII) in a ratio of the number of double bonds:number of $NH_2$ groups=1:1. An aminoaldimine which, in addition to an aldimino group, also contains a secondary amino group forms.

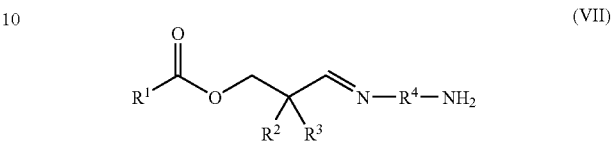

In the formula (VII), $R^1$, $R^2$, $R^3$ and $R^4$ have the same meaning as described for formula (I).

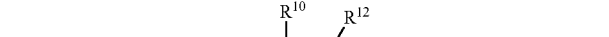

Thus, aldimines of the formula (XI) in which X is the radical N—$R^8$ and $R^8$ is a monvalent hydrocarbon radical of the formula (IX) or (IX') form. Here, in the formulae (VIII), (IX) and (IX'), $R^9$ is a radical which is selected from the group consisting of —$COOR^{13}$, —CN, —$NO_2$, —$PO(OR^{13})_2$, —$SO_2R^{13}$ and —$SO_2OR^{13}$ and $R^{10}$ is a hydrogen atom or a radical from the group consisting of —$R^{13}$, —$COOR^{13}$ and —$CH_2COOR^{13}$ and $R^{11}$ and $R^{12}$, independently of one another, are a hydrogen atom or a radical from the group consisting of —$R^{13}$, —$COOR^{13}$ and —CN, $R^{13}$ being in each case a monovalent hydrocarbon radical having 1 to 20 C atoms.

The amine C is an aliphatic amine having two primary amino groups.

Examples of suitable amines C are aliphatic diamines, such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 2-butyl-2-ethyl-1,5-pentanediamine, 1,6-hexamethylenediamine (HMDA), 2,2,4- and 2,4,4-trimethylhexamethylenediamine and mixtures thereof (TMD), 1,7-heptanediamine, 1,8-octanediamine, 2,4-dimethyl-1,8-octanediamine, 4-aminomethyl-1,8-octanediamine, 1,9-nonanediamine, 2-methyl-1,9-nonanediamine, 5-methyl-1,9-nonanediamine, 1,10-decanediamine, iso-decanediamine, 1,11-undecanediamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine; cycloaliphatic diamines, such as 1,2-, 1,3- and 1,4-diaminocyclohexane, bis(4-aminocyclohexyl)methane ($H_{12}$MDA), bis(4-amino-3-methylcyclohexyl)methane, bis (4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)cyclohexane, 1-cyclohexylamino-3-aminopropane, 2,5(2,6)-bis(aminomethyl)bicyclo[2.2.1]heptane (NBDA, produced by Mitsui Chemicals), 3(4),8(9)-bis(aminomethyl)tricyclo-[5.2.1.0$^{2,6}$]decane, 1,4-diamino-2,2,6-trimethylcyclohexane (TMCDA), 3,9-bis(3-aminopropyl)-2,4,8,10-tetraoxaspiro[5.5]undecane; arylaliphatic diamines, such as 1,3-xylylenediamine (MXDA), 1,4-xylylenediamine (PXDA), aliphatic diamines containing ether groups, such as bis(2-aminoethyl)ether, 4,7-dioxadecane-1,10-diamine, 4,9-dioxadodecane-1,12-diamine and higher oligomers thereof; polyoxyalkylenediamines, obtainable, for example, under the name Jeffamine® (produced by Huntsman Chemicals). Preferred diamines are those in which the primary amino groups are separated by a chain of at least 5 atoms, or by a ring, in particular 1,5-diamino-2-methylpentane, 1,6-hexamethylenediamine, 2,2,4- and 2,4,4-trimethylhexamethylenediamine and mixtures thereof, 1,10-decanediamine, 1,12-dodecanediamine, 1,3- and 1,4-diaminocyclohexane, bis(4-aminocyclohexyl)methane, bis(4-amino-3-methylcyclohexyl)methane, 1-amino-3-aminomethyl-3,5,5-trimethylcyclohexane, 1,3- and 1,4-bis(aminomethyl)cyclohexane, 2,5(2,6)-bis(aminomethyl)bicyclo[2.2.1]heptane, 3(4),8(9)-bis(aminomethyl)tricyclo[5.2.1.0$^{2,6}$]decane, 1,4-diamino-2,2,6-trimethylcyclohexane (TMCDA), 3,9-bis(3-aminopropyl)-2,4,8,10-tetraoxaspiro[5.5]-undecane, 1,3- and 1,4-xylylenediamine, and polyoxyalkylenediamines, obtainable, for example, under the name Jeffamine® (produced by Huntsman Chemicals).

Examples of suitable Michael acceptors of the formula (VIII) are maleic or fumaric acid diesters, such as dimethyl maleate, diethyl maleate, dibutyl maleate, diethyl fumarate; citraconic acid diesters, such as dimethyl citraconate; acrylic or methacrylic acid esters, such as methyl(meth)acrylate, ethyl (meth)acrylate, butyl(meth)acrylate, lauryl (meth)acrylate, stearyl(meth)acrylate, tetrahydrofuryl (meth)acrylate, isobornyl(meth)acrylate; itaconic acid diesters, such as dimethyl itaconate; cinnamic acid esters, such as methyl cinnamate; vinylphosphonic acid diesters, such as dimethyl vinylphosphonate; vinylsulfonic acid esters, in particular aryl vinylsulfonates; vinyl sulfones; vinyl nitriles, such as acrylonitrile, 2-pentenenitrile or fumaronitrile; 1-nitroethylenes, such as β-nitrostyrene; and Knoevenagel condensates, such as, for example those obtained from malonic acid diesters and aldehydes, such as formaldehyde, acetaldehyde or benzaldehyde. Maleic acid diesters, acrylic acid esters, phosphonic acid diesters and vinylnitriles are preferred.

The reaction of the aldehyde A with the amine C to give the intermediate of formula (VII) is effected in a condensation reaction with elimination of water, as described further above for the reaction of the aldehyde A with the amine B. The stoichiometry between the aldehyde A and the amine C is chosen so that 1 mol of aldehyde A is used for 1 mol of amine C. A solvent-free preparation process is preferred, the water formed in the condensation being removed from the reaction mixture by application of a vacuum.

The reaction of the intermediate of the formula (VII) with the Michael acceptor of the formula (VIII) is effected, for example, by mixing the intermediate with a stoichiometric or slightly superstoichiometric amount of the Michael acceptor of the formula (VIII) and heating the mixture at temperatures of from 20 to 110° C. until complete conversion of the intermediate into the aldimine of the formula (XI). The reaction is preferably effected without use of solvents.

The aldimines of the formula (XI) can, if appropriate, be in equilibrium with cyclic forms, as shown by way of example in formula (X). These cyclic forms are cyclic animals, for example imidazolidines or tetrahydropyrimidines, in the case of aminoaldimines; cyclic aminoacetals, for example oxazolidines or tetrahydrooxazines, in the case of hydroxyaldimines; cyclic thioaminals, for example thiazolidines or tetrahydrothiazines, in the case of mercaptoaldimines.

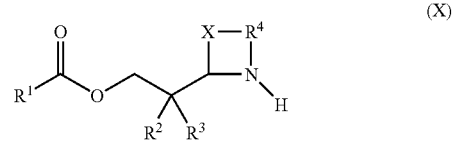

(X)

In the formula (X), $R^1$, $R^2$, $R^3$, $R^4$ and X have the same meaning as described for formula (I).

Surprisingly, most aldimines of the formula (XI) do not tend to undergo cyclization. Particularly for aminoaldimines it is possible to show by means of IR and NMR spectroscopic methods that these compounds are present predominantly in the open-chain form, i.e. the aldimine form, whereas the cyclic form, i.e. the animal form, does not occur or occurs only in traces. This is in contrast to the behavior of the aminoaldimines according to the prior art, as described, for example, in U.S. Pat. No. 4,404,379 and U.S. Pat. No. 6,136,942: those are in fact present mainly in the cycloaminal form. Hydroxy- and mercaptoamines in which the primary amino group are separated from the hydroxyl or the mercapto group by a chain of at least 5 atoms, or by a ring, also show scarcely any cyclization. The substantial absence of cyclic structures in the aldimines of the formula (XI) is to be regarded as advantageous, in particular with respect to the use thereof in isocyanate-containing compositions, since the aldimines are thereby substantially free of the basic nitrogen atoms which occur in animals, oxazolidines and thioaminals and which could reduce the shelf-life of the isocyanate-containing composition.

The aldimines of the formula (XI) are odorless. They have a long shelf-life under suitable conditions, in particular in the absence of moisture. On admission of moisture, the aldimine groups of the aldimines can hydrolyze via intermediates formally to amino groups, the corresponding aldehyde A used for the preparation of the aldimine being liberated. Since this hydrolysis reaction is reversible and the chemical equilibrium is substantially on the aldimine side, it is to be assumed that only some of the aldimine groups undergo partial or complete hydrolysis in the absence of groups reactive toward amines.

A polyurethane polymer D of the formula (XII) which is solid at room temperature and has isocyanate groups is suitable as polyurethane polymer D for the preparation of a polyurethane polymer of the formula (I) which is solid at room temperature and has aldimine groups.

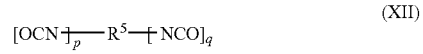

(XII)

In the formula (XII), p, q and $R^5$ have the same meaning as described for formula (I).

Polyetherdiols, polyesterdiols and polycarbonatediols, and mixtures of these diols, are particularly suitable as diols for the preparation of a polyurethane polymer D.

Particularly suitable polyetherdiols, also referred to as polyoxyalkylenediols, are those which are polymerization products of ethylene oxide, 1,2-propylene oxide, 1,2- or 2,3-butylene oxide, tetrahydrofuran or mixtures thereof, possibly polymerized with the aid of an initiator having two active hydrogen atoms per molecule, such as, for example, water, ammonia or compounds having two OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, aniline and mixtures of the abovementioned compounds. Both polyoxyalkylenediols which have a low degree of unsaturation (measured according to ASTM D-2849-69 and stated in milliequivalents of unsaturation per gram of diol (mEq/g)), prepared, for example, with the aid of so-called double metal cyanide complex catalysts (DMC catalysts), and polyoxyalkylenediols having a higher degree of unsaturation, prepared, for example, with the aid of anionic catalysts, such as NaOH, KOH or alkali metal alcoholates, can be used.

Particularly suitable are polyetherdiols or polyoxyalkylenediols, in particular polyoxyethylenediols.

Polyoxyalkylenediols having a degree of unsaturation of less than 0.02 mEq/g and having a molecular weight in the range from 1000 to 30 000 g/mol, and polyoxypropylenediols having a molecular weight of from 400 to 8000 g/mol are especially suitable.

So-called "EO-endcapped" (ethylene oxide-endcapped) polyoxypropylenediols are also particularly suitable. The latter are special polyoxypropylenepolyoxy-ethylenediols which are obtained, for example, if pure polyoxypropylenediols are alkoxylated with ethylene oxide after the end of the polypropoxylation and thereby have primary hydroxyl groups. In the present document, "molecular weight" is always understood as meaning the weight average molecular weight $M_n$.

The most suitable polyetherdiols are those having a degree of unsaturation of less than 0.02 mEq/g and having a molecular weight in the range from 7000 to 30 000, in particular from 10 000 to 25 000 g/mol. For example, such polyethers are sold under the trade name Acclaim®® by Bayer.

Particularly suitable polyesterdiols are those which are prepared from dihydric alcohols, such as, for example, 1,2-ethanediol, diethylene glycol, 1,2-propanediol, dipropylene glycol, 1,4-butanediol, 1,5-pentanediol, 1,6-hexanediol, neopentylglycol, or mixtures of the abovementioned alcohols, with organic dicarboxylic acids or the anhydrides or esters thereof, such as, for example, succinic acid, glutaric acid, adipic acid, pimelic acid, suberic acid, azelaic acid, sebacic acid, dodecanedicarboxylic acid, maleic acid, fumaric acid, phthalic acid, isophthalic acid, terephthalic acid and hexahydrophthalic acid or mixtures of the abovementioned acids, and polyesterdiols obtained from lactones, such as, for example, from ε-caprolactone.

Particularly suitable polyesterdiols are polyesterdiols obtained from adipic acid, azelaic acid, sebacic acid or dodecanedicarboxylic acid as dicarboxylic acid and from hexanediol or neopentyl glycol as a dihydric alcohol. The polyesterdiols preferably have a molecular weight of from 1000 to 15 000 g/mol, in particular from 1500 to 8000 g/mol, preferably from 1700 to 5500 g/mol.

Semicrystalline, crystalline and amorphous polyesterdiols which are liquid at room temperature and are in the form of adipic acid/hexanediol polyesters, azelaic acid/hexanediol polyesters and dodecanedicarboxylic acid/hexanediol polyesters are particularly suitable. Suitable polyesterdiols which are liquid at room temperature are solid not far below room temperature, for example at temperatures of from 0° C. to 25° C.

Suitable polycarbonatediols are those which are obtainable by reacting, for example, the above-mentioned dihydric alcohols—used for the synthesis of the polyesterdiols—with dialkyl carbonates, diaryl carbonates or phosgene.

Preferred diols are polyesterdiols and polycarbonatediols.

Particularly preferred diols are polyesterdiols, in particular a mixture of an amorphous and a crystalline or semicrystalline polyesterdiol, or a mixture of a polyesterdiol which is liquid at room temperature and a crystalline or semicrystalline polyesterdiol, or a mixture of a semicrystalline and a crystalline polyesterdiol. If a polyesterdiol which is liquid at room temperature is used, this is solid not far below room temperature, in particular at a temperature of from 0° C. to 25° C.

Commercially available aliphatic, cycloaliphatic or aromatic diisocyanates can be used as diisocyanates for the preparation of a polyurethane polymer D containing isocyanate groups, for example the following:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane-1,3- and 1,4-diisocyanate and any desired mixtures of these isomers, 1-isocyanato-3,3,5-trimethyl-5-isocyanatomethylcyclohexane (=isophorone diisocyanate or IPDI), perhydro-2,4,- and 4,4'-diphenylmethane diisocyanate (HMDI or $H_{12}MDI$), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and 1,4-xylylene diisocyanate (m- and p-TMXDI), bis(1-isocyanato-1-methylethyl)naphthalene, 2,4- and 2,6-toluoylene diisocyanate and any desired mixtures of these isomers (TDI), 4,4'-, 2,4'- and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TOBI), oligomers and polymers of the abovementioned isocyanates, and any desired mixtures of the abovementioned isocyanates. MDI, TDI, HDI, $H_{12}MDI$ and IPDI are preferred.

The preparation of the polyurethane polymer D is effected in a known manner directly from the diisocyanates and the diols, or by stepwise addition processes, which are also known as chain extension reactions.

What is important is that the polyurethane polymer D has isocyanate groups and is solid at room temperature. In a preferred embodiment, the polyurethane polymer D is prepared via a reaction of at least one diisocyanate and at least one diol, the isocyanate groups being present in stoichiometric excess relative to the hydroxyl groups. Advantageously, the ratio between isocyanate and hydroxyl groups, referred to as "NCO/OH ratio" for short, is from 1.3 to 2.5, in particular from 1.5 to 2.2.

The polyurethane polymer D has a molecular weight of, preferably, more than 1000 g/mol, in particular one of from 1200 to 50 000 g/mol, preferably one of from 2000 to 30 000 g/mol. Furthermore, the polyurethane polymer D has (p+q) isocyanate groups, (p+q) being 2.

It is clear to the person skilled in the art that the diols used for the preparation of the polyurethane polymer D are generally of industrial quality and are therefore mixtures of oligomers of different chain length, monomer composition and OH functionality. Thus, owing to the preparation process, industrial diols, in particular polyetherdiols, contain not only a predominant proportion of diols but also monools, so that their average OH functionality is not exactly 2, but, for example, somewhat less than 2. On the other hand, industrial diols may also contain small proportions of triols in addition to diols and monools, for example owing to the concomitant use of trifunctional initiators, monomers or crosslinking agents, so that their average OH functionality may also be somewhat higher than 2.

The reaction between the aldimine of the formula (XI) and the polyurethane polymer D to give the polyurethane polymer of the formula (I) which has aldimino groups is effected under known conditions, as are typically used for reactions between the reactive groups involved in the respective reaction, for example at a temperature of from 20° C. to 100° C. It is preferably effected at a temperature at which the polyurethane polymer D is present in liquid form. The reaction is effected with the use of a solvent or preferably in the absence of a solvent. If appropriate, auxiliaries, such as, for example, catalysts, initiators or stabilizers, can be concomitantly used. The reaction is preferably carried out without a catalyst for aminoaldimines, whereas use of a catalyst as used for the urethanization reaction between isocyanates and alcohols, for example an organotin compound, a bismuth complex, a tertiary amine compound or a combination of such catalysts, may be expedient for hydroxy-, mercapto- and ureaaldimines.

If the addition reaction between the aldimine of the formula (XI) and the polyurethane polymer D to give the polyurethane polymer of the formula (I) is carried out stoichiometrically, i.e. with one mole equivalent of active hydrogen of the aldimine (XI) per mole equivalent of isocyanate groups of the polyurethane polymer D—with the result that the reactive groups thereof are completely reacted—a dialdimine is obtained as the adduct of the formula (I).

Preferably, however, the addition reaction between the aldimine of the formula (XI) and the polyurethane polymer D is carried out substoichiometrically, i.e. with less than one mole equivalent of active hydrogen of the aldimine (XI) per mole equivalent of isocyanate groups of the polyurethane polymer D. Thus, the isocyanate groups are only partially reacted, which leads to at least one polyurethane polymer of the formula (I) which has aldimino groups and which likewise has isocyanate groups, i.e. with q=1.

Preferred polyurethane polymers of the formula (I) which have aldimino groups are those of the formulae (I a), (I b) and (I c)

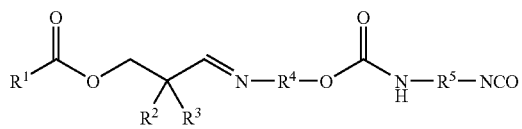

(Ia)

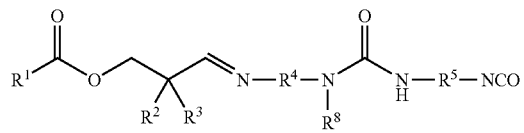

(Ib)

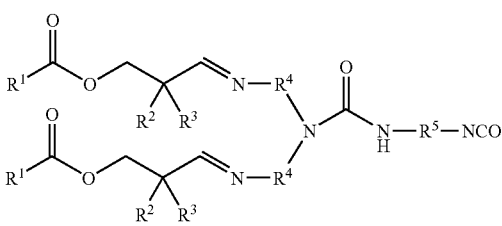

(Ic)

in which $R^1$, $R^2$, $R^3$, $R^4$ and $R^5$ have the above-mentioned meanings, and $R^8$ is a monovalent hydrocarbon radical having 1 to 20 C atoms which optionally has at least one carboxylic acid ester, nitrile, nitro, phosphonic acid ester, sulfone or sulfonic acid ester group.

The polyurethane polymers of the formula (I) which have aldimino groups are odorless, like the aldimines of the formula (XI). They have a long shelf-life under suitable conditions, in particular in the absence of moisture.

On admission of moisture, the aldimino groups can hydrolyze via intermediates formally to give amino groups, the corresponding aldehyde A used for the preparation of the aldimine of the formula (XI) being liberated. In the absence of isocyanate groups, i.e. in the case of polyurethane polymers of the formula (I) where q=0, it is to be assumed that only a part of the aldimino groups undergo partial or complete hydrolysis, since the hydrolysis reaction is reversible and the chemical equilibrium is substantially on the aldimine side. In the case of polyurethane polymers of the formula (I) where q=1, on the other hand, the liberated amino groups react with the isocyanate groups, which leads to crosslinking of the polyurethane polymer. The reaction of the isocyanate groups with the hydrolyzing aldimino groups need not necessarily be effected via amino groups. Of course, reactions with intermediates of the hydrolysis reaction are also possible. For example, it is conceivable for a hydrolyzing aldimino group in the form of a hemiaminal to react directly with an isocyanate group.

Throughout the document, the terms "crosslinking" or "crosslinking reaction" designate the process of the formation of high molecular weight polyurethane plastics, initiated by the chemical reaction of isocyanate groups, even when predominantly chains form thereby.

The compositions described may optionally contain a polyurethane polymer P having isocyanate groups.

This is preferably a polyurethane polymer D as has already been described for the preparation of a polyurethane polymer of the formula (I) which has aldimino groups, i.e. a polyurethane polymer which is solid at room temperature and has isocyanate groups.

The aldimino groups present in the composition are typically present in a slightly superstoichiometric, stoichiometric or substoichiometeric ratio relative to the isocyanate groups present in the composition.

Advantageously, the ratio between aldimino groups and isocyanate groups is from 0.3 to 1.1, in particular from 0.5 to 1.05. If the polyurethane polymer of the formula (I) which has aldimino groups has no isocyanate groups, i.e. q in formula (I) is zero, or if the polyurethane polymer of the formula (I) which has aldimino groups has two or more aldimino groups, i.e. is, for example, a compound of the formula (I c), the composition inevitably contains a polyurethane polymer P having isocyanate groups. In this way, a suitable ratio of aldimino groups to isocyanate groups, as described above, is achieved.

If the polyurethane polymer of the formula (I) which has aldimino groups has only one aldimino group and one isocyanate group, i.e. is, for example, a compound of the formula (I a) or (I b), the presence of a polyurethane polymer P is optional since in this case a composition without polyurethane polymer P also has a suitable ratio of aldimino groups to isocyanate groups.

The composition described has a surprisingly low content of monomeric diisocyanates. This is particularly advantageous for the use as hotmelt adhesive since monomeric diisocyanates are expelled in gaseous form during the application and, as irritant, sensitizing or toxic substances, may be a health hazard for the processor. The content of monomeric diisocyanates is very low particularly when the composition contains, as a polyurethane polymer, mainly a polyurethane polymer of the formula (I) which was prepared by the substoichiometric reaction of a polyurethane polymer D with an aldimine of the formula (XI), in particular with less than a half mole equivalent of active hydrogen of the aldimine (XI) per mole equivalent of isocyanate groups of the polyurethane polymer D.

In a preferred preparation process for the composition described, all components of the composition which contain monomeric diisocyanates are present in the reaction mixture in the reaction of the aldimines of the formula (XI) with the polyurethane polymer D having isocyanate groups. Compositions prepared in this manner have the lowest content of monomeric diisocyanates.

Preferably, the composition described has a content of monomeric diisocyanates of $\leq 0.3\%$ by weight, particularly preferably of $\leq 0.2\%$ by weight and in particular of $\leq 0.1\%$ by weight.

The composition described optionally contains further constituents as are usually used according to the prior art, in particular:

- unreactive thermoplastic polymers, such as, for example, homo- or copolymers of unsaturated monomers, in particular from the group consisting of ethylene, propylene, butylene, isobutylene, isoprene, vinyl acetate or higher esters thereof, and (meth)acrylate, ethylene/vinyl acetate copolymers (EVA), atactic poly-α-olefins (APAO), polypropylene (PP) and polyethylene (PE) being particularly suitable;
- catalysts for the reaction of the aldimino groups and/or of the isocyanate groups, in particular acids or compounds hydrolyzable to acids, for example organic carboxylic acids, such as benzoic acid, salicylic acid or 2-nitrobenzoic acid, organic carboxylic anhydrides, such as phthalic anhydride or hexahydrophthalic anhydride, silyl esters of organic carboxylic acids, organic sulfonic acids, such as methanesulfonic acid, p-toluenesulfonic acid or 4-dodecylbenzenesulfonic acid, or further organic or inorganic acids; metal compounds, for example tin compounds, such as dibutyltin diacetate, dibutyltin dilaurate, dibutyltin distearate, dibutyltin diacetylacetonate, dioctyltin dilaurate, dibutyltin dichloride and dibutyltin oxide, tin(II) carboxylates, stannoxanes, such as lauryl stannoxane, bismuth compounds, such as bismuth(III) octanoate, bismuth(III) neodecanoate or bismuth(III) oxinates; tertiary amines, for example 2, 2'-dimorpholinodiethyl ether and other morpholine ether derivatives, 1,4-diazabicyclo[2.2.2]octane and 1,8-diazabicyclo[5.4.0]undec-7-ene; combinations of said catalysts, in particular mixtures of acids and metal compounds, or of metal compounds and tertiary amines;
- reactive diluents or crosslinking agents, for example oligomers or polymers of diisocyanates, such as MDI, PMDI, TDI, HDI, 1,12-dodecamethylene diisocyanate, cyclohexane 1,3- or 1,4-diisocyanate, IPDI, perhydro-2, 4'- and 4,4'-diphenylmethane diisocyanate ($H_{12}$MDI), 1,3- and 1,4-tetramethylxylylene diisocyanate, in particular isocyanurates, carbodiimides, uretonimines, biurets, allophanates and iminooxadiazinediones of said diisocyanates, adducts of diisocyanates with shortchain polyols, adipic acid dihydrazide and other dihydrazides, and blocked curing agents in the form of polyaldimines, polyketimines, oxazolidines or polyoxazolidines;
- fillers, plasticizers, adhesion promoters, in particular compounds containing silane groups, UV absorbents, UV or heat stabilizers, antioxidants, flameproofing agents, optical brighteners, pigments, dyes and drying agents, and further substances usually used in isocyanate-containing compositions.

In a preferred embodiment, the composition described is free of carbon black.

In a further preferred embodiment, the composition described is completely free of fillers. Such a composition is particularly suitable for the adhesive bonding of substrates in which at least one of the substrates to be adhesively bonded is transparent or translucent.

The sum of the polyurethane polymer of the formula (I) which is solid at room temperature and has aldimino groups and of the polyurethane polymer P having isocyanate groups is suitably from 40 to 100% by weight, in particular from 75 to 100% by weight, preferably from 80 to 100% by weight, based on the total composition.

The composition described is prepared and stored in the absence of moisture. In a suitable, climatically tight packaging or arrangement, such as, for example, in a drum, bag or cartridge, it has an outstanding shelf-life. In the present document, the terms "having a long shelf-life" and "shelf-life" in association with a composition designates that the viscosity of the composition at the application temperature on suitable storage in the time span considered does not increase or at most increases to such an extent that the composition remains usable in the intended manner.

For the mode of action of a reactive hotmelt adhesive, it is important that the adhesive is capable of being melted, i.e. that it has a sufficiently low viscosity at the application temperature in order to be capable of being applied, and that, on cooling, it builds up a sufficient adhesive strength as rapidly as possible even before the crosslinking reaction with atmospheric humidity is complete (initial strength). It has been found that the compositions described have a viscosity which can be readily handled at the application temperatures in the range from 85° C. to 200° C., typically from 120° C. to 160° C., which are customary for hotmelt adhesives, and that, on cooling, they build up a good adhesive strength sufficiently rapidly.

On application, the composition described comes into contact with moisture, in particular in the form of atmospheric humidity. Simultaneously with the physical hardening due to solidification during cooling, the chemical crosslinking with moisture also begins, mainly by virtue of the fact that the aldimino groups present are hydrolyzed by moisture and react in the manner described above rapidly with isocyanate groups present. Excess isocyanate groups likewise crosslink with moisture in a known manner.

The moisture required for the chemical crosslinking may either originate from the air (atmospheric humidity) or the composition can be brought into contact with a water-containing component, for example by coating or by spraying, or a water-containing component, for example in the form of a water-containing paste, which is mixed in, for example via a static mixer, can be added to the composition during the application.

The compositions described show a greatly reduced tendency to the formation of bubbles during the crosslinking with moisture, since—depending on stoichiometry, little or no carbon dioxide is formed during the crosslinking by the presence of aldimino groups.

In a preferred embodiment, the composition described is used as a reactive polyurethane hotmelt adhesive, referred to as PU-RHM for short.

In the application as PU-RHM, the composition is used for the adhesive bonding of a substrate S1 and a substrate S2.

Such adhesive bonding comprises the steps i) heating of a composition as described above to a temperature of from 85° C. to 200° C., in particular from 120° C. to 160° C.;

ii) application of the heated composition to a substrate S1;

iii) bringing of the applied composition into contact with a second substrate S2 within the open time;

the second substrate S2 consisting of a material which is the same as or different from that of the substrate S1.

The step iii) is typically followed by a step iv) of the chemical crosslinking of the composition with moisture. It is clear to the person skilled in the art that the crosslinking reaction can begin as early as during the adhesive bonding, depending on factors such as the composition used, the substrates, the temperature, the ambient humidity and the adhesion geometry. However, the main part of the crosslinking generally takes place after the adhesive bonding.

The substrates S1 and/or S2 can, if required, be pretreated before the application of the composition. Such pretreatments comprise in particular physical and/or chemical cleaning and activation methods, for example grinding, sandblasting, brushing, corona treatment, plasma treatment, flame treatment, etching or the like, or treatment with cleaners or solvents or the application of an adhesion promoter, an adhesion promoter solution or a primer.

The substrates S1 and S2 may comprise a multiplicity of materials. Plastics, organic materials, such as leather, fabrics, paper, wood, resin-bound wood-base materials, resin-textile composite materials, glass, porcelain, ceramic and metals and metal alloys, in particular coated or powder-coated metals and metal alloys, are particularly suitable.

Suitable plastics are in particular polyvinyl chloride (PVC), acrylonitrile-butadiene-styrene copolymers (ABS), SMC (sheet molding composites), polycarbonate (PC), polyamide (PA), polyester, polyoxymethylene (POM), polyolefins (PO), in particular polyethylene (PE), polypropylene (PP), ethylene/propylene copolymers (EPM) and ethylene/propylene-diene terpolymers (EPDM), preferably PP or PE surface-treated by plasma, corona or flames.

Transparent materials, in particular transparent plastic films, are considered to be preferred materials for the substrates S1 and S2. Another preferred transparent material is glass, in particular in the form of a sheet.

The thickness of the adhesive layer (adhesive bond thickness) is typically 10 microns or more. In particular, the adhesive bond thickness is from 10 microns to 20 millimeters, especially from 80 microns to 500 microns. In the case of thick layers, however the crosslinking is usually very slow, owing to the slow water diffusion.

The composition described is used in particular in an industrial manufacturing process.

The composition described is particularly suitable as a PU-RHM for adhesive bonds in which the adhesive bonding point is visible. Thus, it is firstly suitable in particular for the adhesive bonding of glass, in particular in vehicle and window construction. Secondly, it is suitable in particular for the adhesive bonding of transparent packagings.

Articles result from the adhesive bonding process. Such articles are firstly in particular articles from the transport, furniture or textile sector. The preferred transport sector is the automotive sector.

Examples of articles of this type are water or land vehicles, such as automobiles, buses, trucks, trains or ships; automotive interior finishing parts, such as roofs, sun visors, instrument panels, door side parts, rear shelves and the like; wood fiber materials from the shower and bath sector; decorative furniture sheets, membrane sheets with textiles, such as cotton, polyester sheets in the apparel sector or textiles with foams for automotive finishing.

On the other hand, such articles are in particular articles from the packaging sector. In particular, such an article is a transparent packaging.

The compositions described, comprising a) at least one polyurethane polymer of the formula (I) which is solid at room temperature and has aldimino groups and b) optionally at least one polyurethane polymer P having isocyanate groups, have a number of advantages over the prior art when used as reactive hotmelt adhesive compositions.

Thus, they have a greatly reduced content of monomeric diisocyanates and thus lead to greatly reduced contamination of the processor with health-hazardous diisocyanate vapors during their use. With the compositions described, commercially available hotmelt adhesive compositions based on readily obtainable diisocyanates, such as 4,4'-MDI or IPDI, and having an extremely low content of monomeric diisocyanates are obtainable. The low content of monomeric diisocyanates is achieved by the reaction of polyurethane polymers D with aldimines of the formula (XI), the active hydrogen present in the aldimines evidently preferentially reacting with the monomeric diisocyanates present in the polyurethane polymer D.

Furthermore, the compositions described have a high crosslinking rate when used as hotmelt adhesive, even if they contain only slowly reacting aliphatic isocyanate groups, such as, for example, those of IPDI or $H_{12}$MDI. PU-RHM according to the prior art, based on purely aliphatic diisocyanates, generally have such a low crosslinking rate that they cannot be used for most applications.

Furthermore, the compositions described show a greatly reduced tendency to the formation of bubbles, because no carbon dioxide is formed in the crosslinking reaction of isocyanate groups with hydrolyzing aldimino groups, in contrast to the crosslinking of isocyanate groups with moisture.

In addition to these advantages, when used as hotmelt adhesive, the compositions described have properties that are similarly good compared with those of the systems according to the prior art, namely fast adhesive strength, good heat distortion resistance and a high final strength in combination with good extensibility, it being possible to adapt the final mechanical properties in a very broad range to the needs of an adhesion application.

In a further aspect, the invention relates to a method for reducing the content of monomeric diisocyanates in polyurethane polymers having isocyanate groups or in compositions which contain polyurethane polymers having isocyanate groups, by reacting the polyurethane polymers having isocyanate groups with at least one aldimine of the formula (XI).

EXAMPLES a) Description of the Test Methods

The total content of aldimino groups and free amino groups in the compounds prepared ("amine content") was determined titrimetrically (with 0.1N $HClO_4$ in glacial acetic acid, against crystal violet) and is always stated in mmol $NH_2/g$ (even if not only primary amino groups are referred to).

The content of monomeric diisocyanates was determined by means of HPLC (detection via photodiode array) and is stated in % by weight, based on the total composition.

The viscosity was measured at the respective stated temperature using a Brookfield viscometer with spindle number 27 and 10 revolutions per minute.

The open time was determined as follows: the composition was applied to a silicone-coated paper at a temperature of 150° C. and a thickness of 500 μm. This test specimen was then placed on a substrate at room temperature. As soon as a paper strip pressed lightly onto the adhesive could be detached from the adhesive, the open time had elapsed. Thereafter, the adhesive cured in each case and became solid.

The tensile strength and the elongation at break were determined on the basis of DIN 53504 on test specimens having a layer thickness of 500 μm and the dimensions 120 mm×20 mm. The films for the production of the test specimen were applied at an adhesive temperature of 140° C. and then stored for 2 weeks at 23° C. and 50% relative humidity.

b) Preparation of Aldimines of the Formula (XI)

Aldimine 1

30.13 g (0.106 mol) of 2,2-dimethyl-3-lauroyloxy-propanal were initially introduced under a nitrogen atmosphere in a round-bottomed flask. 15.00 g (0.096 mol) of N-cyclohexyl-1,3-propanediamine were added from a dropping funnel in the course of 5 minutes with vigorous stirring, the temperature of the reaction mixture increasing to 36° C. The volatile constituents were then removed in vacuo (10 mbar, 80° C.). 43.2 g of a colorless, clear and odorless liquid which had a low viscosity at room temperature and an amine content of 4.39 mmol $NH_2/g$ were obtained.

Aldimine 2

28.06 g (0.099 mol) of 2,2-dimethyl-3-lauroyloxy-propanal were initially introduced under a nitrogen atmosphere in a round-bottomed flask. 10.00 g (0.095 mol) of 2-(2-aminoethoxy)ethanol (Diglycolamine® Agent; Huntsman) were added from a dropping funnel in the course of 3 minutes with vigorous stirring, the temperature of the reaction mixture increasing to 40° C. The volatile constituents were then removed in vacuo (10 mbar, 80° C.). 36.3 g of a colorless, clear and odorless liquid which had a low viscosity at room temperature and an amine content of 2.58 mmol $NH_2/g$ were obtained.

Aldimine 3

69.31 g (0.244 mol) of 2,2-dimethyl-3-lauroyloxy-propanal were initially introduced under a nitrogen atmosphere in a round-bottomed flask. 14.72 g (0.112 mol) of dipropylenetriamine were added from a dropping funnel in the course of 5 minutes with vigorous stirring, the temperature of the reaction mixture increasing to 36° C. The volatile constituents were then removed in vacuo (10 mbar, 80° C.). 79.7 g of a colorless, clear and odorless liquid which had a low viscosity at room temperature and an amine content of 4.17 mmol $NH_2/g$ were obtained.

c) Preparation of Polyurethane Polymers D

Polyurethane polymer D1

800 g of Dynacoll® 7250 (liquid polyesterdiol, OH number 21 mg KOH/g; Degussa), 200 g of Dynacoll® 7360 (crystalline polyesterdiol, OH number 30 mg KOH/g, melting point 55° C.; Degussa) and 102 g of 4,4'-diphenylmethane diisocyanate (4,4'-MDI; Desmodur® 44 MC L, Bayer) were reacted by a known process at 100° C. to give an NCO-terminated polyurethane polymer. The reaction product had a titrimetrically determined content of 1.5% by weight of free isocyanate groups and was solid at room temperature.

Polyurethane polymer D2

The same diol mixture as in polyurethane polymer D1 was reacted with 102 g of 2,4'-diphenylmethane diisocyanate (2,4'-MDI; Lupranat® MCI, BASF) by a known process at 100° C. to give an NCO-terminated polyurethane polymer. The reaction product had a titrimetrically determined content of 1.5% by weight of free isocyanate groups and was solid at room temperature.

Polyurethane Polymer D3

The same diol mixture as in polyurethane polymer D1 was reacted with 107 g of 4,4'-methylenedicyclohexyl diisocyanate ($H_{12}MDI$; Desmodur® W, Bayer) by a known process at 100° C. to give an NCO-terminated polyurethane polymer. The reaction product had a titrimetrically determined content of 1.5% by weight of free isocyanate groups and was solid at room temperature.

Polyurethane Polymer D4

The same diol mixture as in polyurethane polymer D1 was reacted with 90.4 g of isophorone diisocyanate (IPDI: Vestanat® IPDI, Degussa) by a known process at 100° C. to give an NCO-terminated polyurethane polymer. The reaction product had a titrimetrically determined content of 1.5% by weight of free isocyanate groups and was solid at room temperature.

d) Preparation of Hotmelt Adhesive Compositions

Example 1

95.0 parts by weight of polyurethane polymer D1 and 7.7 parts by weight of aldimine 1 were homogeneously mixed at a temperature of 130° C. and left for 1 hour at 130° C. The resulting polyurethane polymer having aldimino and isocyanate groups was stored at room temperature in the absence of moisture.

Example 2

95.0 parts by weight of polyurethane polymer D1 and 6.5 parts by weight of aldimine 2 were homogeneously mixed at a temperature of 130° C. and left for 1 hour at 130° C. The resulting polyurethane polymer having aldimino and isocyanate groups was stored at room temperature in the absence of moisture.

Example 3

95.0 parts by weight of polyurethane polymer D1 and 8.1 parts by weight of aldimine 3 were homogeneously mixed at a temperature of 130° C. and left for 1 hour at 130° C. The resulting polyurethane polymer having aldimino and isocyanate groups was stored at room temperature in the absence of moisture.

Example 4

Comparison 100 parts by weight of polyurethane polymer D1.

TABLE 1

Properties of Examples 1 to 4

| | Example | | | |
|---|---|---|---|---|
| | 1 | 2 | 3 | 4 (comparison) |
| Monomeric 4,4'-diphenylmethane diisocyanate [%] | 0.24 | 0.05 | 0.38 | 2.42 |
| Viscosity at 90° C. [Pa · s] | 43.1 | 117.3 | 120.0 | 23.6 |
| Viscosity at 110° C. [Pa · s] | 21.2 | 24.7 | 21.1 | 11.9 |
| Viscosity at 130° C. [Pa · s] | 12.4 | 16.3 | 14.7 | 7.0 |
| Open time [min] | 3.5 | 2.5 | 3.5 | 2 |
| Tensile strength [MPa] | 8.5 | 6.5 | 8.8 | 7.1 |
| Elongation at break [%] | 1200 | 1100 | 800 | 1100 |

Example 5

Example 5 was carried out like Example 1, the polyurethane polymer D2 being used instead of the polyurethane polymer D1.

Example 6

Example 6 was carried out like Example 2, the polyurethane polymer D2 being used instead of the polyurethane polymer D1.

Example 7

Example 7 was carried out like Example 3, the polyurethane polymer D2 being used instead of the polyurethane polymer D1.

Example 8

Comparison 100 parts by weight of polyurethane polymer D2.

TABLE 2

Properties of Examples 5 to 8

| | Example | | | |
|---|---|---|---|---|
| | 5 | 6 | 7 | 8 (comparison) |
| Monomeric 2,4'-diphenylmethane diisocyanate [%] | 0.06 | <0.01 | 0.04 | 0.94 |
| Viscosity at 90° C. [Pa · s] | 19.0 | 21.4 | 19.6 | 11.5 |
| Viscosity at 110° C. [Pa · s] | 9.3 | 11.3 | 9.0 | 5.9 |
| Viscosity at 130° C. [Pa · s] | 5.6 | 7.0 | 5.7 | 3.5 |
| Open time [min] | 2.5 | 3 | 3.5 | 1.5 |

Example 9

Example 9 was carried out like Example 1, the polyurethane polymer D3 being used instead of the polyurethane polymer D1.

Example 10

Example 10 was carried out like Example 2, the polyurethane polymer D3 being used instead of the polyurethane polymer D1.

Example 11

Example 11 was carried out like Example 3, the polyurethane polymer D3 being used instead of the polyurethane polymer D1.

Example 12

Comparison 100 parts by weight of polyurethane polymer D3.

TABLE 3

Properties of Examples 9 to 12

| | Example | | | |
|---|---|---|---|---|
| | 9 | 10 | 11 | 12 (comparison) |
| Monomeric $H_{12}MDI$ [%] | 0.60 | 0.76 | 1.07 | 3.26 |
| Viscosity at 90° C. [Pa · s] | 15.0 | 15.7 | 18.6 | 13.5 |
| Viscosity at 110° C. [Pa · s] | 7.2 | 7.8 | 9.1 | 7.2 |
| Viscosity at 130° C. [Pa · s] | 4.4 | 5.1 | 5.0 | 4.6 |
| Open time [min] | 3.5 | 3.5 | 4 | 4 |

Example 13

Example 13 was carried out like Example 1, the polyurethane polymer D4 being used instead of the polyurethane polymer D1.

Example 14

Example 14 was carried out like Example 2, the polyurethane polymer D4 being used instead of the polyurethane polymer D1.

Example 15

Example 15 was carried out like Example 3, the polyurethane polymer D4 being used instead of the polyurethane polymer D1.

Example 16

Comparison 100 parts by weight of polyurethane polymer D4.

TABLE 4

Properties of Examples 13 to 16

| Example | 13 | 14 | 15 | 16 (comparison) |
|---|---|---|---|---|
| Monomeric IPDI [%] | 0.26 | 0.17 | 0.36 | 1.77 |
| Viscosity at 90° C. [Pa · s] | 15.4 | 18.7 | 18.8 | 11.5 |
| Viscosity at 110° C. [Pa · s] | 7.6 | 9.5 | 9.3 | 6.2 |
| Viscosity at 130° C. [Pa · s] | 4.4 | 5.3 | 5.0 | 3.9 |
| Open time [min] | 2.5 | 2 | 3 | 4.5 |

From the examples shown, it is clear that the compositions according to the invention have substantially lower contents of monomeric diisocyanates than the corresponding compositions according to the prior art without aldimino groups, their applicability as reactive hotmelt adhesives being ensured.

The invention claimed is:

1. A composition comprising
a) at least one polyurethane polymer of the formula (I) which is solid at room temperature and has aldimino groups

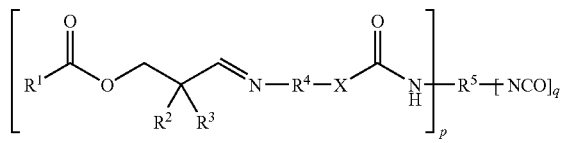

in which
p is an integer 1 or 2 and
q is an integer 0 or 1,
with the proviso that p+q=2;
$R^1$ is either
a monovalent hydrocarbon radical having 6 to 30 C atoms which optionally has at least one heteroatom;
or
is a substituent of the formula (II)

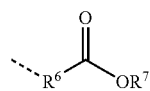

in which
$R^6$ is a divalent hydrocarbon radical having 2 to 20 C atoms which optionally has at least one heteroatom;
and
$R^7$ is a monovalent hydrocarbon radical having 1 to 20 C atoms;
$R^2$ and $R^3$ either,
independently of one another, are each a monovalent hydrocarbon radical having 1 to 12 C atoms;
or
together form a divalent hydrocarbon radical having 4 to 20 C atoms, which is part of an optionally substituted carbocyclic ring having 5 to 8, preferably 6, C atoms;
and in which
$R^4$ is a divalent hydrocarbon radical having 2 to 12 C atoms which optionally has at least one heteroatom;
$R^5$ is the radical of a polyurethane polymer D which is solid at room temperature and has isocyanate groups, after removal of (p+q) isocyanate groups;
X is O, S or N—$R^8$,
in which
$R^8$ is either
a monovalent hydrocarbon radical having 1 to 20 C atoms which optionally has at least one carboxylic acid ester, nitrile, nitro, phosphonic acid ester, sulfone or sulfonic acid ester group
or
a substituent of the formula (III)

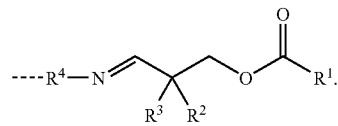

b) at least one polyurethane polymer P having isocyanate groups, if q in formula (I) is zero, or if X in formula (I) is N—$R^8$ with $R^8$ as a substituent of the formula (III).

2. The composition as claimed in claim 1, wherein p=1 and q=1.

3. The composition as claimed in claim 1, wherein the polyurethane polymer D which is solid at room temperature and has isocyanate groups is prepared from at least one diisocyanate and at least one diol.

4. The composition as claimed in claim 1, wherein the polyurethane polymer P is prepared from at least one diisocyanate and at least one diol.

5. The composition as claimed in claim 3, wherein the diol is a polyesterdiol.

6. The composition as claimed in claim 3, wherein the diol is either a mixture of an amorphous and a crystalline or semicrystalline polyesterdiol or a mixture of a polyesterdiol which is liquid at room temperature and a crystalline or semicrystalline polyesterdiol, or a mixture of a semicrystalline and a crystalline polyesterdiol, the polyesterdiol which is liquid at room temperature being solid at a temperature of from 0° C. to 25° C.

7. The composition as claimed in claim 3, wherein the diisocyanate is 4,4'-, 2,4'- and 2,2'-diphenylmethane diisocyanate and any desired mixtures of these isomers, 1,6-hexamethylene diisocyanate, bis(1-isocyanato-1-methylethyl) naphthalene, 2,4- and 2,6-toluoylene diisocyanate and any desired mixtures of these isomers, perhydro-2,4'- and 4,4'-diphenylmethane diisocyanate, or 1-isocyanato-3,3,5-trimethyl-5-isocyanatomethylcylohexane.

8. The composition as claimed claim 1, wherein X is O or N—R$^8$.

9. The composition as claimed in claim 1, wherein R$^2$=R$^3$=methyl and R$^1$ is a monovalent hydrocarbon radical having 11 to 30 C atoms.

10. The composition as claimed in claim 1, wherein the sum of the polyurethane polymer of the formula (I) which is solid at room temperature and has aldimino groups and of the polyurethane polymer P having isocyanate groups is 40-100% by weight, based on the total composition.

11. The composition as claimed in claim 1, wherein the compound of the formula (I) is prepared by the reaction of an aldimine of the formula (XI) with a polyurethane polymer D of the formula (XII) which has isocyanate groups

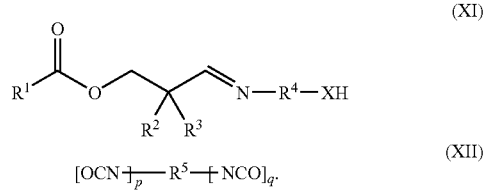

12. The composition as claimed in claim 11, wherein the aldimine of the formula (XI) is present in the reaction in a ratio of less than one mole equivalent of active hydrogen of the aldimine per mole equivalent of isocyanate groups of the polyurethane polymer D.

13. The composition as claimed in claim 1, wherein the content of monomeric diisocyanates is ≦0.3% by weight, based on the total composition.

14. A cured composition obtained by the reaction of moisture with a composition as claimed in claim 1.

15. A method of adhering, sealing, or coating comprising applying a composition as claimed in claim 1 as a hotmelt adhesive.

16. The method as claimed in claim 15, wherein the method is effected in the interior of vehicles or buildings.

17. The method as claimed in claim 15, the composition as an adhesive in industrial manufacture or repair or in civil engineering or building construction or in the interior finishing of means of transport or structures.

18. A method for the adhesive bonding of substrates S1 and S2, comprising the steps
i) heating a composition as claimed in claim 1 to a temperature of from 85° C. to 200° C.;
ii) applying the heated composition to a substrate S1;
iii) bringing the applied composition into contact with a second substrate S2 within an open time;
the second substrate S2 consisting of a material which is the same as or different from that of the substrate S1.

19. The method as claimed in claim 18, wherein step iii) is followed by a step iv) of chemical crosslinking of the composition with moisture.

20. The method as claimed in claim 18, wherein at least one of the substrates S1 or S2 is a plastic, leather, fabric, paper, wood, resin-bound wood-base material, resin-textile composite material, glass, porcelain, ceramic, a metal, or a metal alloy.

21. The method as claimed in claim 18, wherein the composition is applied in a thickness of more than 10 microns.

22. An adhesively bonded article which is produced by a method for adhesive bonding as claimed in claim 18.

23. The adhesively bonded article as claimed in claim 22, wherein the article is a means of transport.

24. A method for reducing the content of monomeric diisocyanates in polyurethane polymers having isocyanate groups or in compositions which contain polyurethane polymers having isocyanate groups by reacting the polyurethane polymers having isocyanate groups with at least one aldimine of the formula (XI)

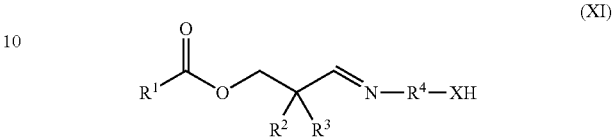

R$^1$ is either
a monovalent hydrocarbon radical having 6 to 30 C atoms which optionally has at least one heteroatom;
or
is a substituent of the formula (II)

in which
R$^6$ is a divalent hydrocarbon radical having 2 to 20 C atoms which optionally has at least one heteroatom,
and
R$^7$ is a monovalent hydrocarbon radical having 1 to 20 C atoms;
R$^2$ and R$^3$ either,
independently of one another, are each a monovalent hydrocarbon radical having 1 to 12 C atoms;
or
together form a divalent hydrocarbon radical having 4 to 20 C atoms which is part of an optionally substituted carbocyclic ring having 5 to 8 C atoms;
and in which
R$^4$ is a divalent hydrocarbon radical having 2 to 12 C atoms which optionally has at least one heteroatom;
R$^5$ is the radical of a polyurethane polymer D which is solid at room temperature and has isocyanate groups, after removal of (p+q) isocyanate groups;
X is O, S or N—R$^8$,
in which
R$^8$ is either
a monovalent hydrocarbon radical having 1 to 20 C atoms which optionally has at least one carboxylic acid ester, nitrile, nitro, phosphonic acid ester, sulfone or sulfonic acid ester group
or
a substituent of the formula (III)

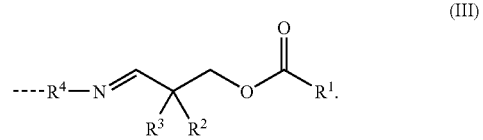

25. A method for the adhesive bonding of substrates S1 and S2, comprising
   i) heating a composition as claimed in claim 9 to a temperature of from 85° C. to 200° C.;
   ii) applying the heated composition to a substrate S1;
   iii) bringing the applied composition into contact with a second substrate S2 within an open time;
   the second substrate S2 consisting of a material which is the same as or different from that of the substrate S1.

26. A method for the adhesive bonding of substrates S1 and S2, comprising
   i) heating a composition as claimed in claim 13 to a temperature of from 85° C. to 200° C.;
   ii) applying the heated composition to a substrate S1;
   iii) bringing the applied composition into contact with a second substrate S2 within an open time;
   the second substrate S2 consisting of a material which is the same as or different from that of the substrate S1.

* * * * *

UNITED STATES PATENT AND TRADEMARK OFFICE
CERTIFICATE OF CORRECTION

| | |
|---|---|
| PATENT NO. | : 7,741,425 B2 |
| APPLICATION NO. | : 11/992120 |
| DATED | : June 22, 2010 |
| INVENTOR(S) | : Urs Burckhardt et al. |

It is certified that error appears in the above-identified patent and that said Letters Patent is hereby corrected as shown below:

Column 24, line 13, change "bocyclic ring having 5 to 8, preferably 6, C atoms;" to --bocyclic ring having 5 to 8 C atoms;--.

Signed and Sealed this
Fifth Day of July, 2011

David J. Kappos
*Director of the United States Patent and Trademark Office*